United States Patent
Van De Velde et al.

(10) Patent No.: US 6,966,657 B2
(45) Date of Patent: Nov. 22, 2005

(54) PROJECTION LENS FIXATION AND ADJUSTMENT MECHANISM

(75) Inventors: Cindy Van De Velde, Sint-Amandsberg (BE); Jan Leo Arteel, Kortrijk (BE); Koen Beyers, Wuustwezel (BE); Koen Van Belle, Kortrijk (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 10/782,289

(22) Filed: Feb. 19, 2004

(65) Prior Publication Data

US 2005/0185152 A1    Aug. 25, 2005

(51) Int. Cl.⁷ ............................. G03B 2/14; G03B 3/00; G02B 7/02
(52) U.S. Cl. ...................................... 353/101; 359/813
(58) Field of Search ................................. 353/101, 100; 359/696, 813, 814; 396/55

(56) References Cited

U.S. PATENT DOCUMENTS

| | | | |
|---|---|---|---|
| 4,659,203 A | | 4/1987 | Niwa |
| 5,659,806 A | * | 8/1997 | Miyamoto et al. ............. 396/55 |
| 6,491,401 B2 | * | 12/2002 | Tachibana ................... 353/101 |
| 6,773,117 B2 | * | 8/2004 | Watanabe ................... 353/101 |
| 2002/0044264 A1 | * | 4/2002 | Lu ............................. 353/101 |
| 2002/0067552 A1 | | 6/2002 | Tanabe |
| 2003/0095337 A1 | | 5/2003 | Tu |
| 2004/0114115 A1 | * | 6/2004 | Runco ........................ 353/101 |

FOREIGN PATENT DOCUMENTS

| | | |
|---|---|---|
| EP | 0179426 A | 4/1986 |
| EP | 1248131 A2 | 10/2002 |
| EP | 1326114 A | 7/2003 |
| JP | 05 249409 A | 1/1994 |
| JP | 07 239434 A | 1/1996 |
| JP | 08 160488 A | 10/1996 |
| JP | 2000 214366 A | 1/2001 |
| JP | 2002323648 A | 11/2002 |
| JP | 2003 315917 A | 12/2003 |

* cited by examiner

Primary Examiner—Christopher Mahoney
(74) Attorney, Agent, or Firm—Barnes & Thornburg

(57) ABSTRACT

A system and method for fixing a projection lens 102 and adjusting the position of a projection lens 102 is provided, which is compact and has a high precision. The projection lens 102 is positioned on a base plate 104. The position of the projection lens can be adjusted by providing possibilities for horizontal and vertical shift in a plane perpendicular to the optical axis of the projection lens 102. This is performed by actuating three points of the base plate 104. Furthermore, by providing further shifting means at the three points of the base plate 104, tilting of the projection lens can be performed, thus providing Scheimpflug correction. In this way, motion of the projection lens in five degrees of freedom is provided by actuating three points at a base plate 104 whereon a projection lens 102 can be easily mounted and removed.

15 Claims, 7 Drawing Sheets

PROJECTION LENS FIXATION AND ADJUSTMENT MECHANISM

TECHNICAL FIELD OF THE INVENTION

The present invention relates to a projection system for projecting images and a method of projecting. More specifically, the present invention relates to a method and system for fixing and adjusting the position and orientation of a projection lens of a projection system.

BACKGROUND OF THE INVENTION

The use of large-screen projection systems is well known. They serve different broad areas of application such as e.g. electronic presentations for business, education, advertising, entertainment, simulation and status and information. In these applications, the demand on flexibility of these systems is continuously increasing. Typically, it is expected that projections can be made at different positions and in different sizes. Shifting of the image to be projected is one of the standard requirements for today's projection systems. Furthermore, in portable projectors, for which the projection conditions continuously change, continuous adjustment needs to be allowed.

Furthermore, especially in the case of portable projectors but also for fixed projection systems, adjustable Scheimpflug correction often is an additional demand, as the position and the size of the projected image and thus also the angle of projection often needs to be varied using the same projection system.

Projection lenses typically have a very wide aperture, but a limited focussing depth. The wide aperture allows a lot of light through so that bright images can be projected, but the down side of the projection lenses is that object, image and projection lens need to be on axis to obtain a focussed image from edge to edge. A projection lens typically is aimed down if the projector is ceiling mounted and up if table mounted. These projection angles are non-perpendicular to the display surface or screen and would normally produce an unfocussed image on the screen—at least in a part of the image. This can be corrected by providing Scheimpflug correction. The correction is done by creating an angle between the object and the lens which cancels out the angle between the lens and the image. Thus, Scheimpflug is a correction which allows the image projected by a large screen projector to be uniformly focused from top to bottom and left to right, even though the lenses are not perpendicular to the screen. In modern projection systems, the need for Scheimpflug correction often is very important.

Electrical adjustment of the position of the image, as typically done in cathode ray tubes, is difficult to adopt in for projection systems. For projection systems typically the projection lens is positioned such that it can be shifted. In the earliest systems, this was obtained by providing a double set of rails, whereby the projection lens could be shifted horizontally and vertically in a plane perpendicular to the optical axis of the system. The shifting mechanism then comprises a rail system with a double set of rails and a housing leading to a quite complex structure. Furthermore the rails need to be very firm to support the projection lens.

The requirements for modern projection systems increase continuously, the size of the projection systems also increases significantly and the size and thus the weight of the projection lens also increases. Therefore a firm, compact lens shift mechanism needs to be provided, allowing movement of the lens according to several degrees of freedom. Several shift mechanisms are already known.

U.S. 2003/0095337 A1 describes an adjustable lens assembly suitable for focussing or zooming, as applicable to a camera, camcorder or surveillance system. The adjustable lens assembly described provides the possibility for motorized movement along the optical axis of the system. U.S. 2003/0095337 A1 furthermore describes a system that allows compensation for unwanted tolerances in manufacturing or assembly of the gear shaft or the guiding elements. By providing a ball-joint-like connection between the lens and the driving member for the linear movement along the optical axis of the system, the bias in the different directions can be absorbed and the movement of the lens can be smooth.

With projection lenses of a larger projection system, the weight of the projection lens will become a limiting factor in to allow the use of ball joint connections. Furthermore, the projection lens should not only be able to move according to different degrees of freedom with respect to the remaining part of the projection system under influence of bias, there should be furthermore also a possibility to obtain the position and/or orientation with respect to the remaining part of the projection system. The teachings of U.S. 2003/0095337 cannot be applied as such to the problem of fixing and adjusting the position of a projection lens in a large projection system.

U.S. 2002/0067552 describes a projection lens shifting mechanism which allows adjustment of the position of the projected image by translating the optical axis of the projection lens unit. The mechanism is based on two additional plates wherein cams can be moved. The movement of the cams allows a shift of the projection lens in a direction perpendicular to the optical axis of the projection lens unit. As the movement of the cams corresponds with a smaller shift of the projection lens, the position of the projection lens can be determined with high precision. U.S. 2002/0067552 does not describe a way for shifting the projection lens in a motorized way. Furthermore, in order to fix the position of the projection lens, additional screws need to be fastened and a complex system needing multiple plates is needed to obtain the shifting mechanism.

A similar system is provided in Japanese patent JP 2002323648 whereby the mechanism for moving the projection lens in a projector comprises two eccentric plates. By rotating these plates, a free lens shift can be realized. The system can be motorized, using a servo mechanism. Nevertheless, the system needs at least two additional eccentric plates and only allows shift in horizontal and vertical directions.

In EP 1 248 131 a projection lens shifting mechanism for a projector that enables two-dimensional movement of a projection lens is described. The system comprises a projection lens fixed on a plate which can be moved in parallel with a second plate fixed to the remaining part of the projection system. For focussing or zooming, the projection lens is provided with a separate rotational system. The horizontal and vertical movement of the projection lens can not be performed completely motorized as levers are provided for switching the shifting mechanism between a shiftable state and a non-shiftable state. In EP 1 248 131 three plates are used for providing horizontal and vertical shifting possibilities for a projection lens. Thus the shifting mechanism has a relative complex structure, comprising multiple plates.

The above mentioned solutions for mechanisms for shifting the projection lens all need at least two plates for providing a shift perpendicular to the optical axis of the system. This makes these solutions relative complex and requires very high precision production of the plates, whereby small errors have a large influence on the quality of the shifting mechanism. To prevent the above mentioned systems from hysteresis effects, fixing means are often introduced to fix the position after adjustment has been applied. Furthermore, none of the known systems provide a way to extend the degrees of freedom for the motion to e.g. to Scheimpflug correction, based on their current shifting mechanism.

SUMMARY OF THE INVENTION

It is an object of the present invention to provide a projection lens system and method for shifting or titing of the lens that allows high precision.

It is another object of the present invention to provide a projection lens system and method for shifting or tilting of the lens that provides an easier assembly.

The above objective is accomplished by a method and device according to the present invention.

The invention relates to a lens position adjustment system for adjusting the position of a lens relative to a projection system. The lens position adjustment system comprises a base plate, a lens fixing means adjusted to fixate a lens against the base plate, a first drive means and a second drive means. The first drive means has at least one drive transfer zone on the base plate for converting a motion of the first drive means to a linear translational motion of the base plate and the second drive means has at least one drive transfer zone on the base plate for converting a motion of the second drive means to a linear translational motion of the base plate, wherein the drive transfer zones all lie in a single plane.

The shifting means may comprise means for horizontally, vertically or combined horizontally and vertically shifting of the base plate in a plane perpendicular to the optical axis of the projection system. The drive transfer zones may have a fixed position with reference to the base plate. Furthermore, each drive transfer zone may comprise a first part, at least one second part connected to the base plate and an eccentric axle in driving contact with the first part, whereby a rotational movement of the eccentric axle may be transferred into a translational movement between the first part and the second part. The lens position adjustment system furthermore may comprise a sliding bearing between the first part and the at least one second part so as to allow translation of the first part and the at least one second part relative to each other. The drive means furthermore may comprise a motor having a motor shaft, and, for the at least one drive transfer zone, a worm gear in driving contact with a gear wheel and an axle located eccentrically on the gearwheel. The first and second drive means may have means for providing movement of the base plate out of the plane perpendicular to the optical axis of the projection system. The means for providing movement out of the plane perpendicular to the optical axis of the projection system may comprise means for providing movement parallel movement of the base plate along the optical axis of the projection system, means for horizontal tilting of the optical axis of the lens compared to the optical axis of the projection system, means for vertical tilting of the optical axis of the lens compared to the optical axis of the projection system and means for providing a combination of horizontal and vertical tilting of the optical axis of the lens compared to the optical axis of the projection system. In each of the three drive transfer zones, the drive means may be adapted for also creating a movement parallel to the optical axis of the projection system. For each of the three drive transfer zones, the eccentric axle may be attached to the gearwheel by a spherical bearing and the eccentric axle may be provided with means for adjusting the position of the first part along the eccentric axle. The lens fixing means of the lens position adjustment system according to the present invention may comprise at least three releasable lens clamps so as to clamp the lens against the base plate. The lens clamps may be kept in a clamping position, allowing to clamp the lens against the base plate, by means of resilient bias means. The lens clamps furthermore may be switchable from a clamping position, allowing to clamp the lens against the base plate, to an open position, allowing to remove the lens from the base plate. The lens clamps may be actuatable by means of levers and the lens fixing means furthermore may comprise a system of rods adjusted to block the levers if these are in a clamping position.

The invention also relates to a projection system comprising a lens position adjustment system as described above, adapted to provide movement of the lens in five degrees of freedom. The five degrees of freedom may correspond with horizontal shift, vertical shift, horizontal Scheimpflug, vertical Scheimpflug and movement along the optical axis of the projection system.

It is a specific advantage of the present invention has a reduced number of parts, i.e. that the number of parts has been kept as little as possible. This furthermore implies a reduced ease of fabrication and a reduced production cost.

It is another specific advantage of the present invention that the system has a reduced overall size and a reduced weight.

It is a specific advantage that Scheimpflug illumination means can be provided or not during production, without the need for changing the overall construction.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for fixing a projection lens to a projection lens system and for adjusting the projection lens position and orientation with respect to the projection lens system.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
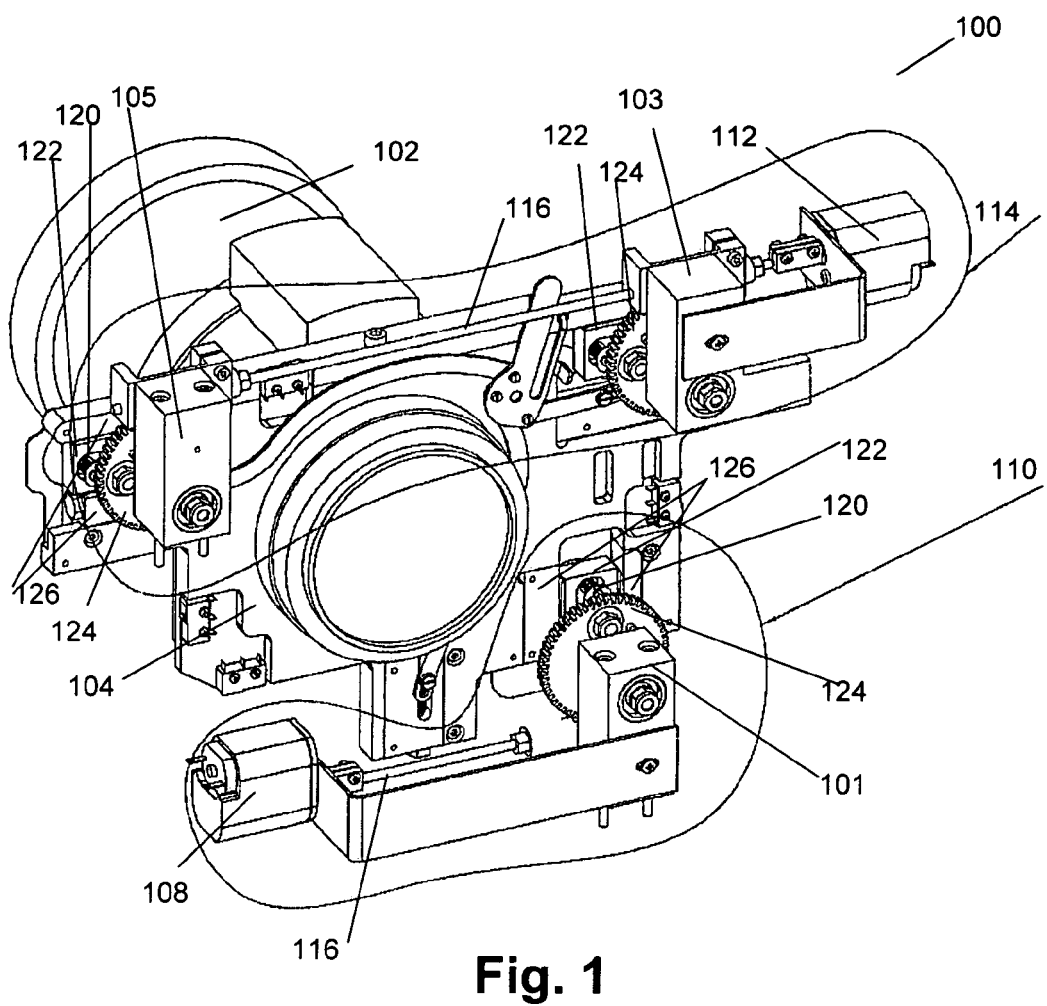
FIG. 1 is a side elevation view of a projection lens and a lens fixation and adjustment system allowing to shift the projection lens horizontally and vertically in a plane perpendicular to the optical axis of the projection system, according to a first embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The present invention relates to a lens fixation and a lens position adjustment system to both fix a projection lens to a projection system and to position the projection lens relatively to the projection system. The projection system typically is used for large-screen applications.

In a first embodiment, a lens fixation and position adjustment system 100 is provided for a projection lens 102 and a base plate 104. The projection lens 102 can be any type of projection lens which can be used for a projection system. Examples of these types are zoom lenses, short throw lenses and ultra short throw lenses. Some examples of these projection lenses with their throw ratio between brackets are projection lens Cosina QFD(1.4:1–2.0:1), projection lens Cosina QFD(2.1:1–3.0:1), projection lens Fujinon QGD (0.8:1) type 1 & 2, projection lens Enplas Optics QFD(1.27: 1), and projection lens Enplas Optics QFD(7:1). The base plate 104, is a rigid plate, suitable for supporting the weight of the projection lens. The base plate 104 can be e.g. made of rigid plastics or metals, such as aluminum, stainless steel, . . . The material preferably is relatively heat resistant so as to avoid deformation due to heating of the plate. Supplemental cooling mechanisms may be provided to avoid extensive heating of the projection lens or deformation of the base plate 104. The projection lens 102 can be fixed to the base plate 104 using any lens fixing means 106 (not shown in FIG. 1) allowing to support the weight of the projection lens 102. At current, the design of the lens holder mechanism is such that it can support a projection lens with a weight of 10 kg. The maximum weight until now for commercially available projection lenses as far as known is 6.53 kg. If heavier lenses are used in the future, the base plate 104 can be made thicker, if the weight of the projection lenses are reduced in the future, the base plate can become thinner. The design of the lens holder thus is not limited by the weight of the projection lens. The lens fixing means 106 may comprise any suitable fixing means such as for example, but not limited to, glue, magnets, screws or other metal fixing means. The lens fixation and position adjustment system 100 allows at least horizontal movement and vertical movement of the projection lens with respect to the remaining projection system, based on the movement of a single plate, i.e. the base plate 104. The system 100, as shown in FIG. 1 thus allows movement in horizontal and vertical direction in a plane perpendicular to the optical axis of the projection system. The left-right shift and up-down shift of the projection lens 102 can optionally be performed in a motorized way in both directions. The projection lens 102 will be shifted horizontally by using a first drive mechanism 110 which includes a motor 108 at the bottom of the complete lens holder. The first drive mechanism 110 used for this lens shift is encircled in FIG. 1. In a similar way, the projection lens 102 will be shifted vertically, i.e. shifted up-down, by activating the second drive mechanism 114 which includes a motor 112 at the top. The second drive mechanism 114 used for this lens shift is also encircled in FIG. 1.

The motors that can be used for this movement can be any type of compact motor that allows to produce a shift of the base plate 104 and the projection lens 102 connected to the base plate 104. This is achieved in accordance with embodiments of the present invention by linking at least two motorised drives to at least two drive transfer zones on the base plate. The drives preferably move the base plate in two orthogonal directions, e.g. up-down (or vice versa) and right-left or vice versa). Preferably at least two drives are linked to three drive transfer zones on the base plate. These drives may be any type of driving means allowing a translational displacement of the base plate 104 in a continuous way. The drives need not be linear translational drives but could be rotating drives which then require a device for transformation of the rotational movement into a linear translational movement of the base plate 104. Preferably, the drives should allow high precision positioning. The motor type is chosen based on the amount of power needed, the weight of the total lens holder mechanism and the allowed time for the complete range of shifting needed. Good examples for these motors are any type of DC PM gearmotors, the specific selection, depending on the above mentioned requirements. A suitable motor can be e.g. a Buehler DC PM gearmotor 1.61.065.425 with the following specifications: a maximum voltage of 16V, a rated voltage of 12V, a rated torque of 150 mNm, a rated speed of 34.0 rpm and a rated current of 140 mA. This may be e.g. a small motor, e.g. an electrical motor, that transfers a rotational movement via a gear or gears onto to an eccentric axle and provides a linear shift of the base plate 104 in this way, as will be described in more detail in the following, or these may be e.g. based on linear actuators, for instance linear motors or pneumatic actuator cylinders. The two motors should provide linear motion in two orthogonal directions. The motors may have open loop or may be servomotors with a positional feedback, e.g. as provided by an encoder such as an optical encoder. It is preferred that these motors do not suffer from inertia and that the driving means are such that the long term drift of the base plate 104 is minimal.

Preferably, a third drive transfer zone on the base plate 104 also may be provided, as connection to three points or zones of the base plate 104 allows full support of the base plate, and no tilting or rotation of the base plate in its own plane is possible anymore. This third transfer zone may be such that the base plate 104 is slidingly in contact with the drive transfer zone such that the base plate 104 can slide in the plane of the base plate 104. The third drive transfer zone may be positioned in a horizontal line respectively in a vertical line with respect to another drive transfer zone, such that the motor driving the latter also can drive the third transfer zone. The motor than drives the transfer zones positioned in line, and provides an equal shift for both points, so that no stress occurs in the motor shaft.

An illustration of such a system is shown in FIG. 1. The drive connections to the base plate are not directly visible in FIG. 1 as they lie beneath parts 101; 103, 105 of the first and second drive mechanism 110; 114, respectively. The second drive mechanism 114 provides a vertical shifting motion for the base plate 104 at two drive transfer zones in or on the base plate 104 while the first drive mechanism 110 provides a horizontal motion to the base plate 104 at one drive transfer zone in or on the base plate 104. A person skilled in the art will appreciate that the third drive transfer zone, i.e. the third point on the base plate whereto motion may be transferred, can alternatively be positioned such that it provides or assists the horizontal shifting motion instead of the vertical shifting motion.

An aspect of the present embodiment is a high precision horizontal and vertical movement of the base plate 104, and thus of the projection lens 102 preferably provided in a stable way by actuating at only three drive transfer zones on the base plate 104. This means that all three drive transfer zones lie on or in the base plate and therefore in one plane. This provides a drive arrangement which has little depth in the direction of the optical axis of the lens 102. It is furthermore a specific advantage of this embodiment of the present invention that the vertical and horizontal shift can be locked by the motors so no additional locking means are necessary.

Figure 2:
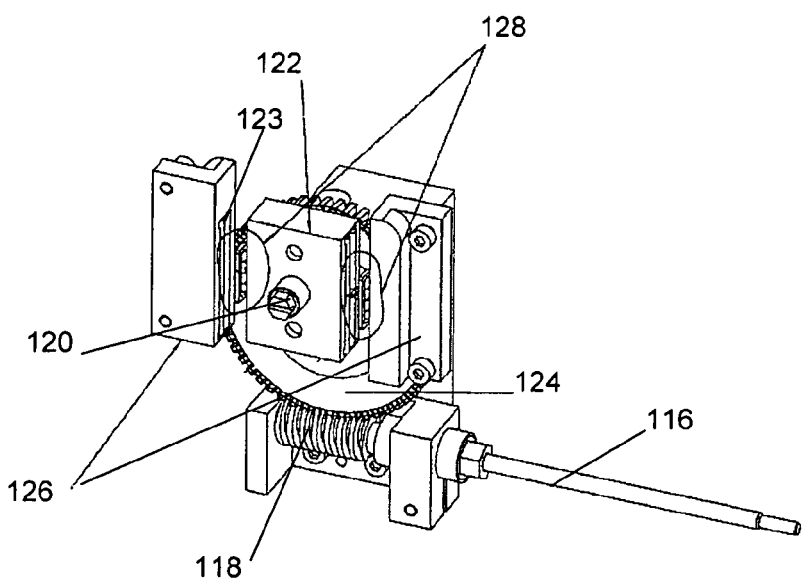
FIG. 2 shows a component of a lens shifting mechanism as shown in FIG. 5, according to the first embodiment of the present invention.
Figure 7:
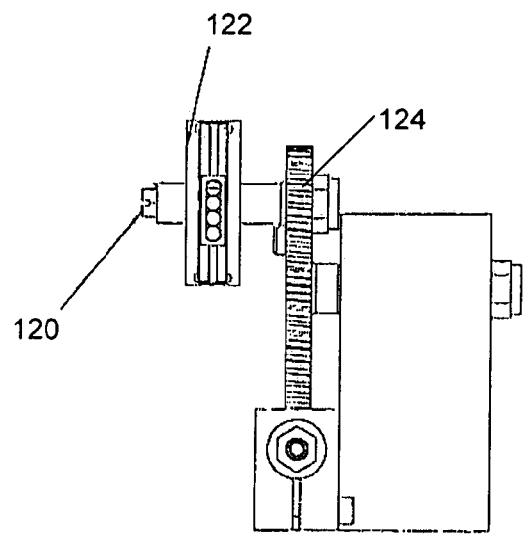
FIG. 7 shows another view of a part of the tilting mechanism as shown in FIG. 3 to FIG. 5, according to the second embodiment of the present invention.

As an example, an acutator mechanism for one drive transfer zone based on providing motion by rotation of a motor shaft 116 which is carried through the gears 118 (not shown in FIG. 1) onto the eccentric axle 120 and on to the motion transfer part 122 and therefore changes the rotation into a translational displacement of the projection lens is discussed in more detail with reference to FIGS. 1, 2 and 7. The amount of shift is limited, and can be determined according to the specification set for each specific lens holder. Proximity switches, e.g. 4 switches, can be placed on the lens holder plate 104 to turn off the motors 108, 112 when the full amount of shift in a specific direction has been reached. FIG. 2 show the principle of this way of lens plate shifting in more detail. The motion transfer part 122 is in driving contact with the base plate 104 at a drive transfer zone and is fixed on to the eccentric axle 120. This contact between the motion transfer part and the base plate is provided by drive surfaces. In this embodiment the drive surfaces are provided on opening within the base plate 104. When the motor (e.g. 108 or 112 of FIG. 1) is turned on, the rotation of the motor shaft 116 is transferred to the worm gear 118 of a worm drive. By rotating the worm gear 118, the large gearwheel 124 is made to rotate as well as the axle 120 which is mounted eccentrically on the gearwheel 124 and will follow the rotation of gearwheel 124. The eccentmic axle 120 is preferably journalled in the motion transfer part 122, i.e. for free rotation. The motion transfer part 122 is positioned between two fixed guide parts 126, so that this part 122 cannot rotate itself. The motion transfer part 122 is free to move in a vertical direction in an opening of the base plate 104 and transfers motion to the lens holder base plate 104 in the horizontal direction. This displacement is transferred to the base plate 104 which moves horizontally as the gearwheel 124 rotates. The displacement is actuated by force transfer to the drive surfaces on the base plate 104. These drive surfaces may include displaceable flat bearings 128 such as dry slip surfaces, e.g. made of Teflon® or ball bearing races or holders. These flat bearings are preferably placed between the two fixed parts 126, i.e. the parts 126 fixed to the base plate 104, and the motion transferring part 122 on the eccentric axle 120 (see FIG. 7 for a further view of the ball bearing races). These flat bearings 128 can slide or roll along a track 123, e.g. made of four cylindrical pins. For each motion transferring part 122, there are 2 tracks 123. Each track 123 is made of four cylindrical pins, i.e. two pins are inserted in part 123 and two pins are inserted in the motion transferring part 122 itself. The second track lies on the opposite side of the motion transferring part 122. Since the motion transferring part 122 is located on or is in driving contact with the eccentric axle 120, the displacement of this part 122 exerts force onto the balls in the ball holder 128 and results in the sideways movement of the fixed parts 126. The parts 126 are fixed to the lens holder base plate 104 and form part of an opening in the base plate 104. This opening is elongate in the direction perpendicular to the direction in which motion is imparted to the base plate 104. This elongated opening serves two purposes—firstly it must be long enough to accommodate the movement caused by the rotation of the eccentric axle 120 and secondly it must have an extra length to accommodate the movement caused by the other drive mechanism when it displaces the base plate 104 by rotation of its own gear wheel 124. For the device shown in FIG. 2, rotation of gearwheel 124 results in a horizontal shift of the lens holder plate 104. For the vertical direction the same actuator mechanism is used rotated through 90°, e.g. with the other drive mechanism 114 to provide a vertical movement. The same actuator mechanism is used for each drive mechanism, the direction of movement being arranged depending on which motor 108, 112 is used. This method of shifting lens 102 provides a high precision shifting possibility which can be performed continuously, i.e. each position within the range can be provided and without inertia problems. The maximum horizontal and vertical shift that can be obtained with this system, depends on the type of eccentric axle/gearwheel combination and the length of the tracks 123. Typically this combination is chosen so that the center of the projection lens 102 can be shifted horizontally over about 100% of the width of the panel and can be shifted vertically over about 120% of the height of the panel. Pratically, the shift of lenses can be typically shifted over a number of millimeters. The amount of shift thus is calculated and correlated to the dimensions of the display device and especially in correlation to the height and width of the display device. An example of such a display device can be a LCD panel (= liquid crystal display panel). In this case the display panel is a 1.8" UXGA panel, but also other sizes and configurations can be used.

In this example the center of the projection lens 102 can be shifted over 10 mm to the left and 10 mm to the right, what corresponds with a horizontal shift of 100% calculated in correlation to the width of the panel. Also the center of the projection lens 102 can be shifted over 10 mm to the top and 10 mm to the bottom, what corresponds with a vertical shift of 120% calculated in correlation to the height of the panel.

One mechanism as shown in FIG. 2 is provided for each drive transfer zone in FIG. 1 whereby its orientation is selected so as to impart the required motion to the base plate 104. In the drive mechanism 114 two actuator mechanisms 103, 105 are provided. This provides a total of three drive transfer zones for the total of both mechanisms 110 and 114. By using a three-point fixing method, the plate 104 of FIG. 1 is constrained to move in two orthogonal directions (let us say in the x and y directions) but not to tilt or rotate.

Figure 3:
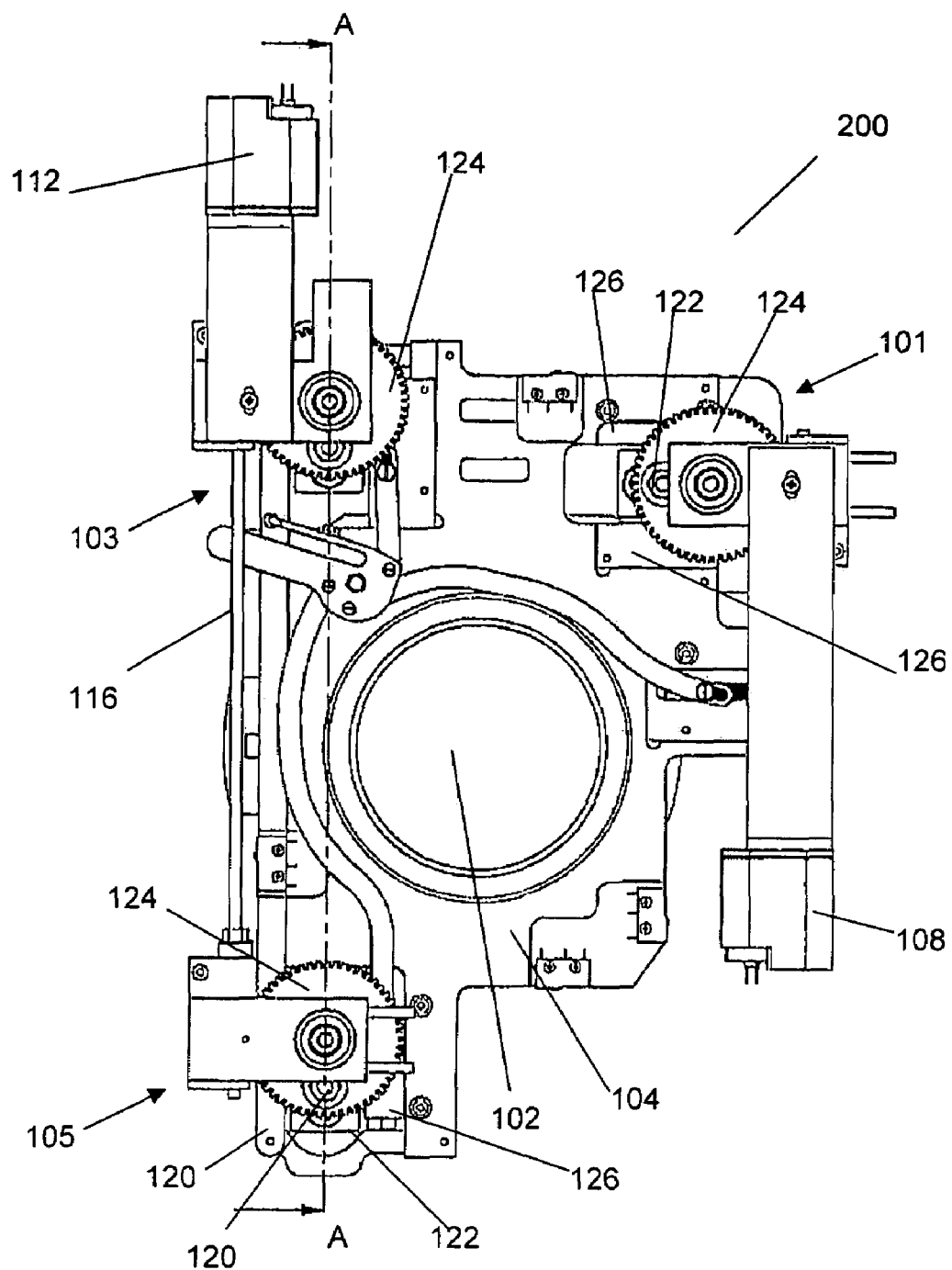
FIG. 3 is a back view of a projection lens and a lens fixation and adjustment system allowing tilt of the projection lens according to a second embodiment of the present invention.
Figure 4:
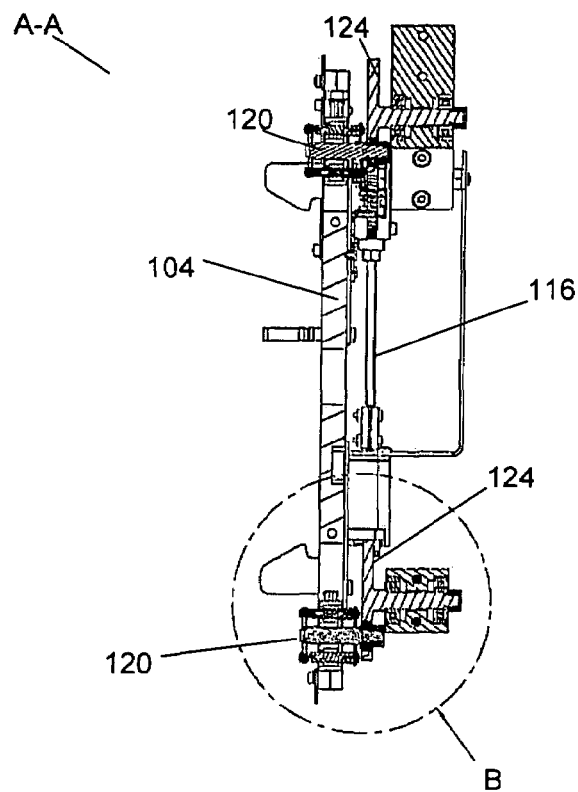
FIG. 4 shows an A—A cross section of the lens tilting mechanism shown in FIG. 3 according to the second embodiment of the present invention.
Figure 5:
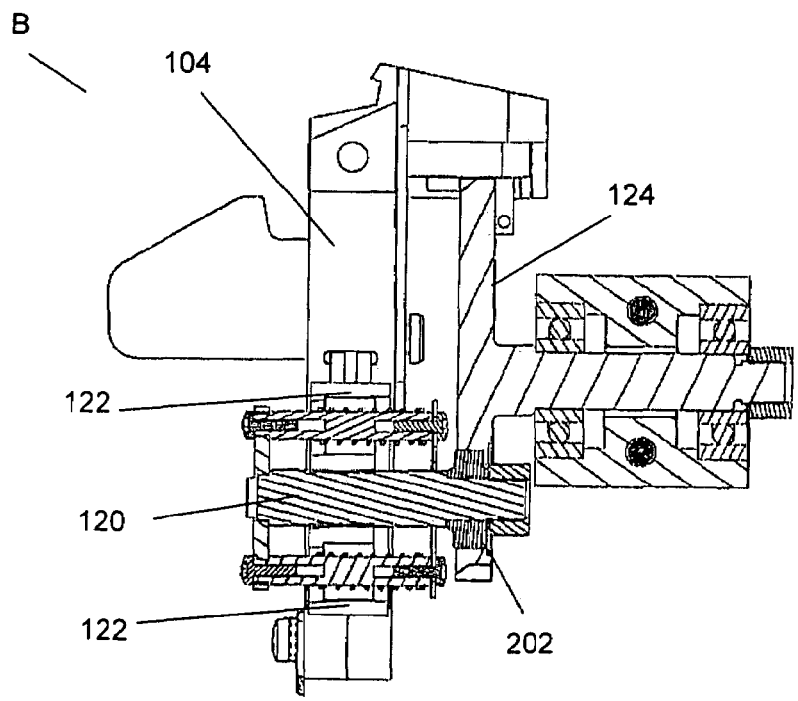
FIG. 5 shows a detailed view of a part of the tilting mechanism as shown in FIG. 3 and FIG. 4 according to the second embodiment of the present invention.
Figure 6:
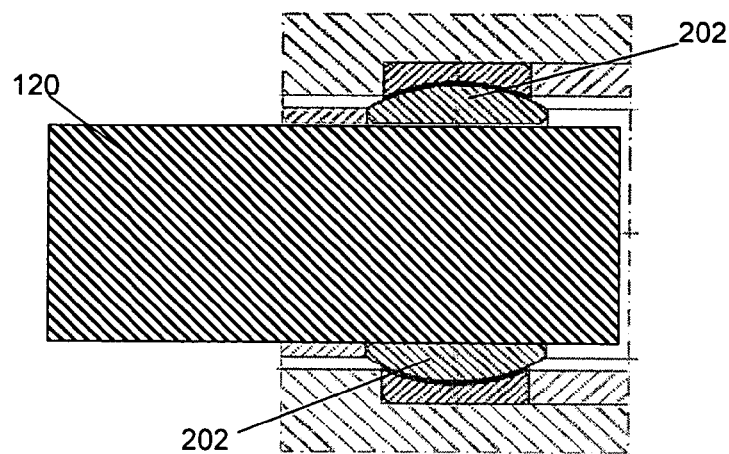
FIG. 6 shows a detailed view of a part of the tilting mechanism.

In a second embodiment of the present invention, a system for fixation and position adjustment 200 of the projection lens according to the previous embodiment is provided, furthermore also allowing to perform Scheimpflug correction with the projection lens 102. The mechanism allowing Scheimpflug is illustrated schematically in FIGS. 3 to 10. As mentioned earlier, to perform Scheimpflug correction the projection lens needs to be positioned such that the optical axis of the projection lens 102 will have to be moved so that the optical axis of lens 102 differs from the optical axis of the projection system. Therefore, the system 200 of the current embodiment according to the invention provides means so the projection lens 102 can rotate around a horizontal axis or a vertical axis (both perpendicular to the optical axis of the lens) or even both together at the same time. This means that Scheimpflug correction can be performed both horizontally and vertically. FIG. 4 shows a cross section A—A as indicated on FIG. 3. FIG. 5 shows a detailed view of the system for actuating movement at one drive transfer zone of the base plate 104 according to the present embodiment of the present invention. A bearing 202 is inserted into the large gear wheel 124 and kept in its place by a fixing means such as a screw. The eccentric axle 120, in the current embodiment, is provided with external thread, and the axle 120 is inserted in the bearing 202. The bearing 202 is constructed so it provides sufficient flexibility to allow the axle 120 to be tilted with respect to the large gear wheel 124. The bearing 202 may be made of hard rubber or is preferably a spherical bearing, as illustrated in FIG. 6. As in the previous embodiment the part 122 is still located between and guided by two guide parts 126 (not shown in FIGS. 3, 4, 5, 6, 7) which form part of an opening in the base plate 104. The motion transferring part 122, in the current embodiment is provided with a hole with an internal thread in which the axle 120 is located. The part 122 is moved along the eccentric axle 120 when this eccentric axle 120 is turned. The axle 120 is free to rotate as the gearwheel 124 rotates so that rotation of the gearwheel 124 does not result in the part 122 moving along the axle 120. Rotation of the axle 120, e.g. by hand allows adjustment of the position of the lens holder base plate 104 which moves back and forward along the eccentric axle 120. This motion will tilt the base plate 104 if not all of the axles 120 are adjusted and equal amount at the same time. Tilting the base plate 104 so that it is no longer in its original plane places a bending moment on some or all of the eccentric axles 120. Accordingly, in accordance with this embodiment the axles 120 can be tilted over a predetermined angle thanks to the use of the bearings 202.

In order to provide horizontal, vertical or a combined Scheimpflug correction, it is sufficient to combine rotations of the 3 eccentric axles 120 in the two drive mechanisms 110, 114 to rotate the projection lens 102 in any desired direction. In other words, by rotating the three eccentric axles 120, the direction of the optical axis of the projection lens 102 can be changed. The maximum degree of tilting that can be obtained for the optical axis of the projection lens compared to the optical axis of the remaining part of the projection system depends on the length of the eccentric axles 120, i.e. more specifically the length of the external thread, and of the maximum angle of the eccentric axles 102 in the bearing 202, which depends on the type of bearings 202 used. In a practical example, the maximum degree of tilting that can be obtained can be e.g. 30 in all directions, i.e. the axles 120 can assume any angle within a 30 cone of rotation.

Rotation of the eccentric axles 120 to move the base plate 104 with respect thereto can be performed by hand, but providing motors to produce this movement and to provide settings for Scheimpflug is included within the scope of this invention.

In the current embodiment, the lens shifting and tilting system can also be applied to zoom or focus. This can be obtained by rotating the 3 eccentric axles 120 equally at the three drive transfer zones. In this way, the base plate 104 and the projection lens 102 are shifted along the z-direction, i.e. the direction which is perpendicular to the base plate in the untilted situation. The latter could also be obtained with a system whereby at only one drive transfer zone, an eccentric axle 120 and motion transferring as described in the above embodiments is provided, and whereby at the other drive transfer zones eccentric axles 120 and motion transferring parts 122 are provided but without threaded axles 120.

Thus in the current embodiment shifting and tilting of the projection lens 102 can be provided according to 5 degrees of freedom for moving the projection lens with respect to the projection system. The projection lens 102 may be shifted horizontally, shifted vertically, undergo horizontal Scheimpflug, undergo vertical Scheimpflug and can be placed at different positions along the z direction. By locating all these parts on one basic plate 104 and also positioning all these components in one plane, it becomes easy to adjust the projection lens in any desired direction. In fact, it is only necessary to shift or rotate the basic plate of the total assembly to obtain the desired result. This is a significant advantage over known solutions where 2 or more parallel plates are needed to shift the lens either horizontally or vertically and where, if Scheimpflug correction is desired, even more plates or other parts were needed. This means that the complexity of assembling several plates on each other is avoided and the need for very strict tolerances of the related parts is reduced. It is a further advantage of the present invention that the dimension of the complete lens holder can be reduced, compared to earlier solutions. Furthermore, a much easier assembly is obtained and the fabrication process is simplified. With this lens fixation and adjustment system, it is also possible to reduce the overall weight, which is an important advantage as the different components in a projection system already have a significant weight and as projection systems should be as light as possible to allow them to be portable or to be mounted at any desired position, e.g. on a ceiling. Furthermore, since no additional parts are necessary the total amount of parts can be kept as little as possible and this results in a more economical production.

It is a specific advantage of the present invention that, if the Scheimpflug correction does not need to be provided which is the case for some applications, the system can be easily adjusted during production. In these cases, the eccentric axle 120 doesn't need external thread, the motion transferring part 122 doesn't need an internal thread and the eccentric axle 120 and the motion transferring part 122 can even become one part instead of two separate ones. If no Scheimpflug correction is desired the total assembly is easier, has a lower weight and is also less expensive than the lens holder with Scheimpflug correction built in. Nevertheless, it is an advantage that with a minor change to the first embodiment, the Scheimpflug correction option can be provided.

In any of the embodiments described, an additional locking system to lock the adjustment of the projection lens 102 with respect to the remaining part of the projection system may be provided. In this case, although the vertical and horizontal shift can be locked by the motors, the projection lens 102 could be broken if the eccentric axles 120 are rotated too much in the bearings 202. Furthermore, due to the motion imparted by motor or by hand, it is possible that the projection lens would change in exact positioning during time because of unwanted rotation inside the bearings 202. Therefore, this additional locking system is desirable, as it is a partial blocking to prevent tilting. The system does not prevent shifting if this is desired. The latter is done by the motors.

Figure 8:
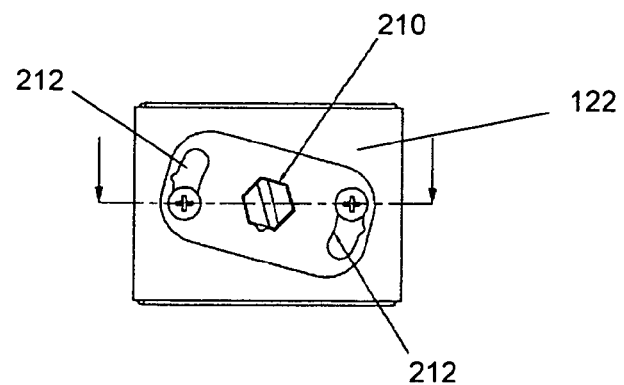
FIG. 8 shows part of an additional locking system for a projection lens fixation and adjustment system according to a further embodiment of the present invention.
Figure 9:
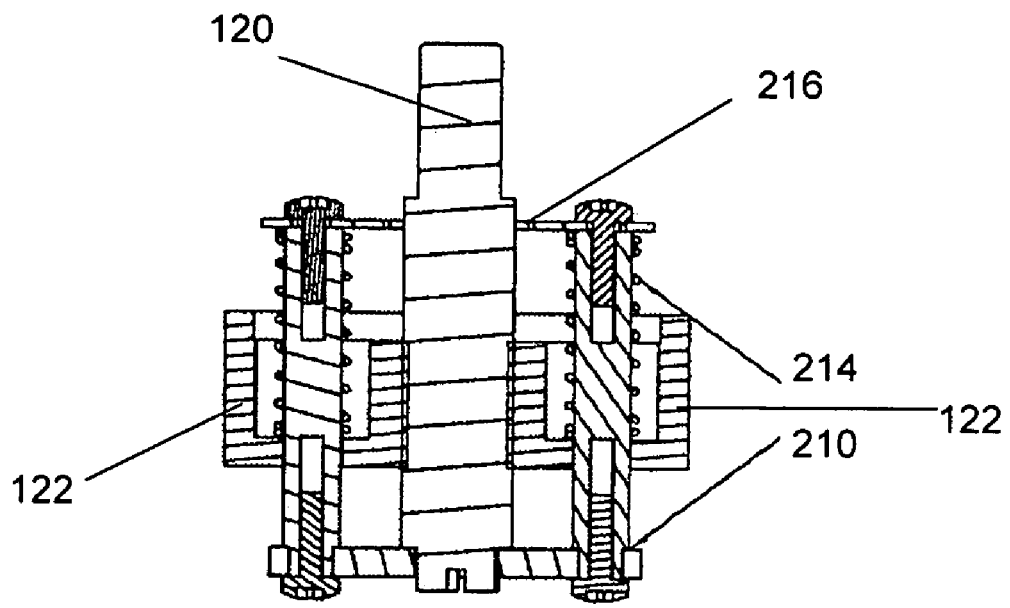
FIG. 9 shows a further part of an additional immobilization and locking system for a projection lens fixation and adjustment system according to a further embodiment of the present invention.
Figure 10:
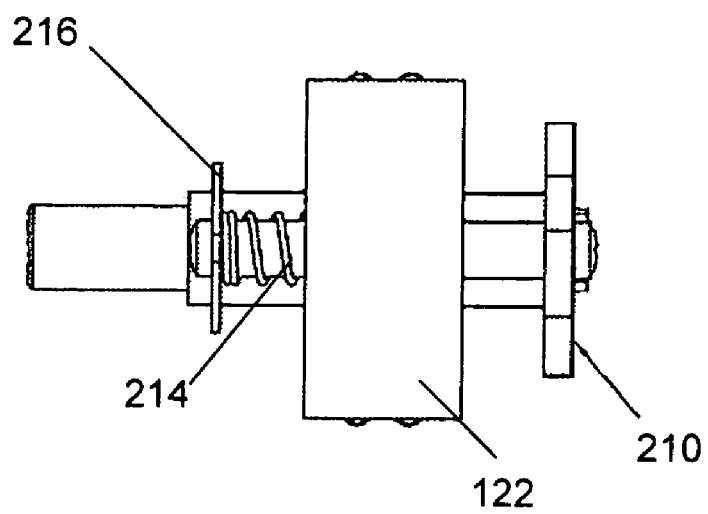
FIG. 10 shows another part of an additional immobilization and locking system for a projection lens fixation and adjustment system according to a further embodiment of the present invention.

For example, to prevent other unwanted movements an additional locking system can be built in the complete lens holder mechanism. This system is showing in FIG. 8, FIG. 9 and FIG. 10. FIG. 8 shows that the amount of rotation is limited by providing limiting holes 212 in a top plate 210, thereby limiting the amount of rotation of the eccentric axle and thus the amount of tilting of the complete lens holder mechanism. The shape of the limiting holes is designed in such a way that each position of the hexagon shaped head of the eccentric axle can be locked while only allowing a very small movement that can be considered as negligible. In FIG. 9 and FIG. 10 it is shown that springs 214 are provided to push a back plate 216 always as far as possible, therefore pulling the top plate 210 over the hexagon shaped head of the eccentric axle 120. By providing these springs 214, the amount of rotation that can be provided for an eccentric axle 120 is limited. In order to rotate the eccentric axle 120, the first plate 210 should be pulled backwards. This is only possible, as far as the eccentric axle 120 has not yet been rotated too far. The springs 214 that are provided thus allow only a limited amount of rotation of the eccentric axles 120, preventing that the eccentric axles 120 are rotated too much and the projection lens 102 drops.

Figure 11:
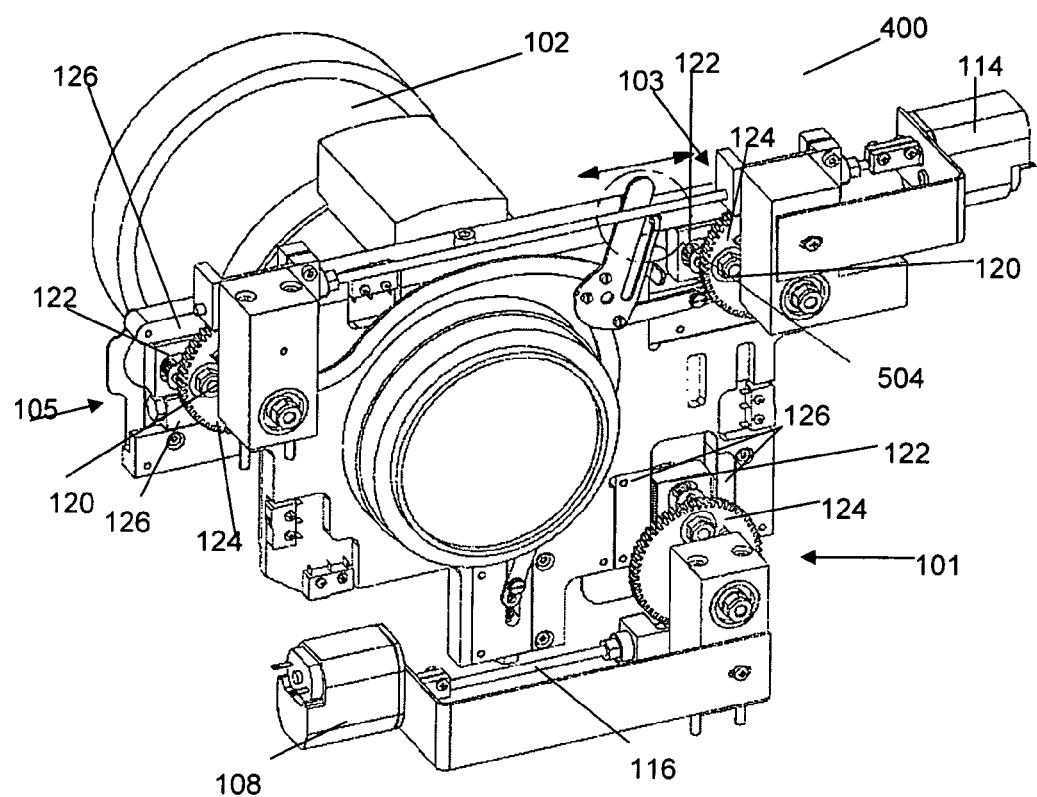
FIG. 11 shows an elevated view of a projection lens fixation and adjustment system providing fixation means for fixating a projection lens to a base plate according to a further embodiment of the present invention.
Figure 12:
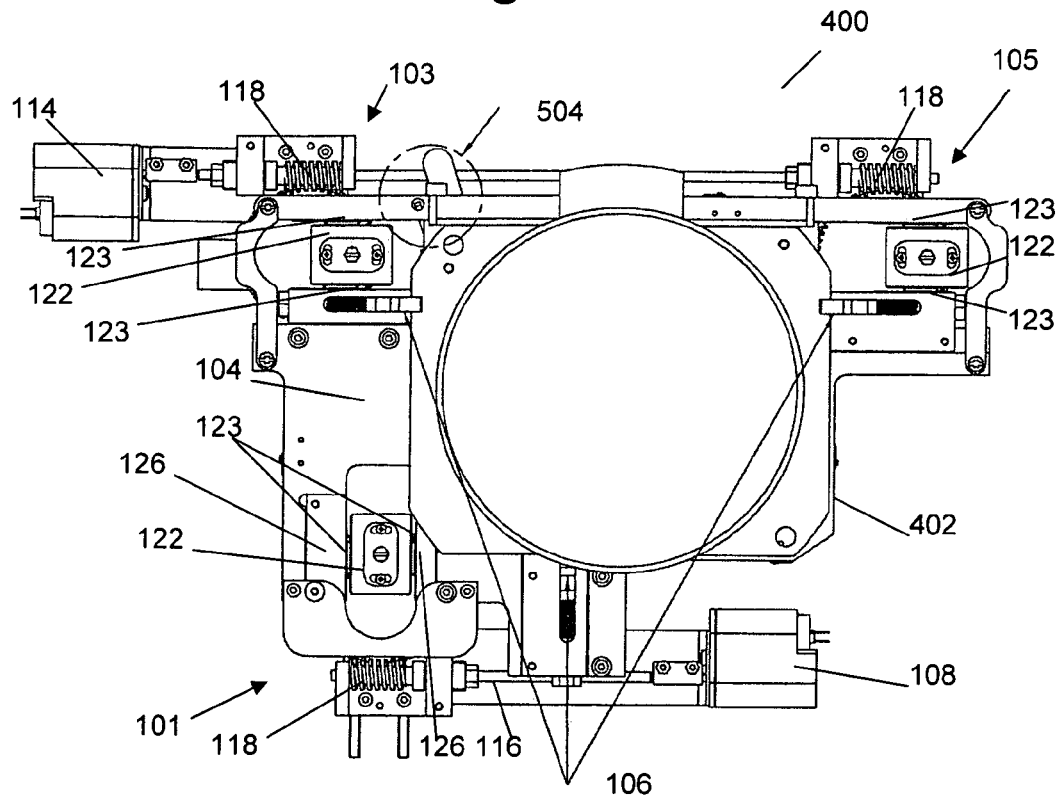
FIG. 12 shows a front view of a projection lens fixation and adjustment system providing fixation means for fixating a projection lens to a base plate according to a further embodiment of the present invention.
Figure 13:
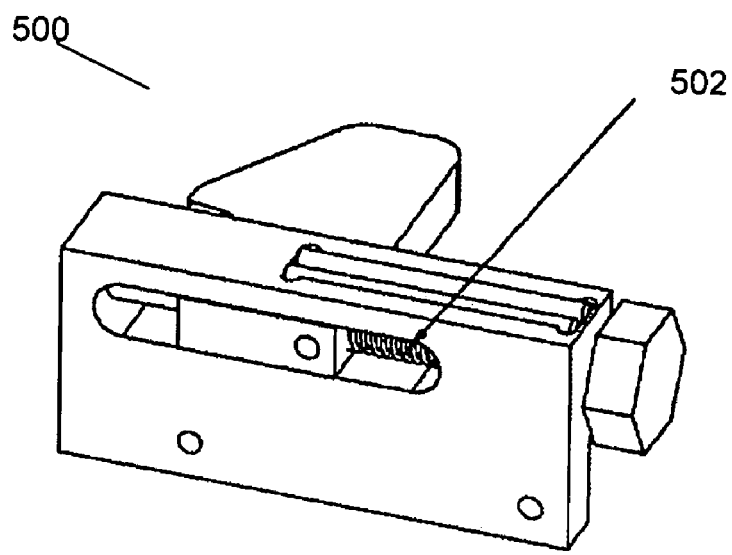
FIG. 13 shows a lens clamp for a fixating means for fixating a projection lens to a base plate in a projection lens fixation and adjustment system as shown in FIG. 11 and FIG. 12, according to a further embodiment of the present invention.
Figure 14:
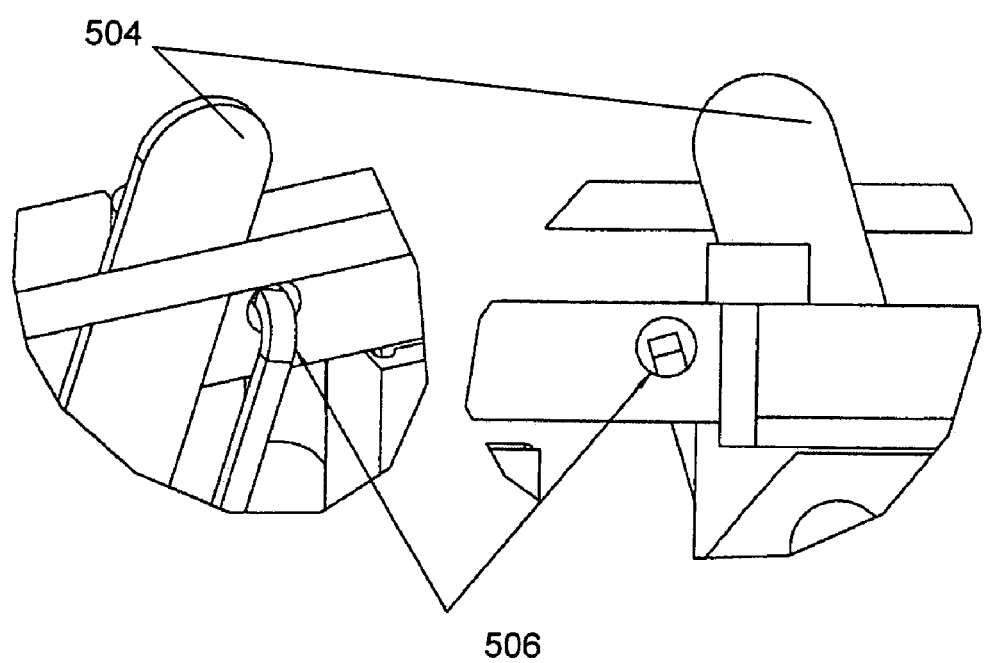
FIG. 14 shows a detailed view of levers to be used in a fixating means for fixating a projection lens to a base plate in a projection lens fixation and adjustment system according to a further embodiment of the present invention.

In a further embodiment of the present invention, the lens fixating and position adjustment system 400 is a system according to any of the previous embodiments, wherein the lens fixing means 106 are such that the fixing can be easily done reversibly, i.e. that both removing and remounting of the projection lens 102 can be done easily. FIG. 11 shows an elevated view of the lens fixating and position adjustment system 400 according to the present invention, while FIG. 12 shows a front view of the system 400. In the current embodiment, a system 400 is provided whereby the lens fixing means 106 allow to remove and remount the projection lens 102 without additional tools. Therefore, the projection lens 102 may be provided with a flange 402 which is integrated on the projection lens 102 itself. Lens fixing means 106 may then be e.g. as shown in detail in FIG. 13, showing a detailed image of a lens clamp 500, based on springs 502. Each lens clamp is always forced to the position "lens fixed" through a spring 502. At least three of these lens clamps pull the flange 402 of the projection lens 102 against the lens holder base plate 104. The three lens clamps 500 therefore are manually placed in the position "lens free". The system may be provided with levers 504 to ease this action. By manually turning the levers 504, the movement of the levers 504 is carried out through the three rods on the three lens clamps 500 and pushed open so that either the projection lens 102 can be released or fixed. Automatically the lever 504 wants to return to the position "lens fixed" because each of the three lens clamps 500 is pushed in that direction by its springs 502. Thus once the projection lens 102 is positioned against the base plate 104, the levers 504 can be released and the projection lens 102 is fixed automatically onto the base plate 104, as the lens clamps 500 are pulling the flange 402 of the projection lens 102 against the lens holder base plate 104 due to the special shape of the lens clamps 500. In a further embodiment, additional lever locking systems may be provided to prevent that the projection lens 102 would fall out of the lens holder if one of the 3 springs would fail. These additional lever locking systems can be metal rods 506 that prevent that a lever 504 would return to the open position if a spring would fail, as shown on FIG. 14, which shows two detailed images, i.e. detail A and detail B indicated in FIG. 11 and FIG. 12.

A specific advantage of these fixing means 106 is that they allow to easily remove and remount projection lenses 102. This may be useful for systems where projection lenses 102 need to be replaced often, e.g. for projection systems used under different conditions for different purposes. This also may be useful for projection systems mounted on the sealing as it reduces the risk of breaking an expensive projection lens during maintenance of systems. All locking parts, used to secure the projection lens 102, are positioned in one plane, but still the projection lens 102 can be moved in all directions.

It is to be understood that although preferred embodiments, specific constructions and configurations, as well as materials, have been discussed herein for devices according to the present invention, various changes or modifications in form and detail may be made without departing from the scope and spirit of this invention.

What is claimed is:

1. A lens position adjustment system for adjusting the position of a lens relative to a projection system, said lens position adjustment system comprising a base plate, a lens fixing means adjusted to fixate a lens against said base plate, a first drive means and a second drive means, said first drive means having at least one drive transfer zone on the base plate for converting a motion of said first drive means to a linear translational motion of said base plate and said second drive means having at least one drive transfer zone on the base plate for converting a motion of said second drive means to a linear translational motion of said base plate, wherein said first drive means and said second drive means have means for providing movement of said base plate out of a plane perpendicular to an optical axis of the projection system and wherein said drive transfer zones all lie in a single plane.

2. A lens position adjustment system according to claim 1, wherein said shifting means comprises means for horizontally, vertically or combined horizontally and vertically shifting of the base plate in a plane perpendicular to the optical axis of said projection system.

3. A lens position adjustment system according to claim 1, wherein said drive transfer zones have a fixed position with reference to the base plate.

4. A lens position adjustment system according to claim 1, wherein a drive transfer zone comprises:

a first part, at least one second part connected to the base plate and an eccentric axle in driving contact with the first part, whereby a rotational movement of said eccentric axle is transferred into a translational movement between said first part and said second part.

5. A lens position adjustment system according to claim 4, comprising a sliding bearing between said first part and said at least one second part so as to allow translation of said first part and said at least one second part to each other.

6. A lens position adjustment system according to claim 4, each of said drive means furthermore comprising a motor having:

a motor shaft
and, for said at least one drive transfer zone, a worm gear in driving contact with a gear wheel, and
an axle located eccentrically on said gearwheel.

7. A lens position adjustment system according to claim 6, wherein in each of the three drive transfer zones, the drive means are adapted for also creating a movement parallel to the optical axis of the projection system.

8. A lens position adjustment system according to claim 6, whereby for each of the three drive transfer zones, said eccentric axle is attached to said gearwheel by a spherical bearing and said eccentric axle is provided with means for adjusting the position of the first part along the eccentric axle.

9. A lens position adjustment system according to claim 1, wherein said means for providing movement out of the plane perpendicular to the optical axis of the projection system comprises means for providing movement parallel movement of the base plate along the optical axis of the projection system, means for horizontal tilting of the optical axis of the lens compared to the optical axis of the projection system, means for vertical tilting of the optical axis of the lens compared to the optical axis of the projection system and means for providing a combination of horizontal and vertical tilting of the optical axis of the lens compared to the optical axis of the projection system.

10. A lens position adjustment system according to claim 1, wherein said lens fixing means comprises at least three releasable lens clamps so as to clamp the lens against said base plate.

11. A lens position adjustment system according to claim 10, wherein said lens clamps are kept in a clamping position, allowing to clamp the lens against the base plate, by means of resilient bias means.

12. A lens position adjustment system according to claim 10, whereby said lens clamps are switchable from a clamping position, allowing to clamp the lens against the base plate, to an open position, allowing to remove said lens from said base plate.

13. A lens position adjustment system according to the claim 10, wherein said lens clamps are actuatable by means of levers and said lens fixing means furthermore comprises a system of rods adjusted to block the levers if these are in a clamping position.

14. A projection system comprising lens position adjustment system according to claim 1 adapted to provide movement of the lens in five degrees of freedom.

15. A projection system according to claim 14 wherein said five degrees of freedom correspond with horizontal shift, vertical shift, horizontal Scheimpflug, vertical Scheimpflug and movement along the optical axis of the projection system.

* * * * *